(12) United States Patent
Bendel et al.

(10) Patent No.: US 11,256,701 B2
(45) Date of Patent: Feb. 22, 2022

(54) INTERACTIVE LINEAGE MAPPING SYSTEM

(71) Applicant: BANK OF AMERICA CORPORATION, Charlotte, NC (US)

(72) Inventors: Timothy J. Bendel, Charlotte, NC (US); David Joa, Pacifica, CA (US); Prakash Srinivasan, Matthews, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 380 days.

(21) Appl. No.: 16/238,311

(22) Filed: Jan. 2, 2019

(65) Prior Publication Data

US 2020/0210435 A1 Jul. 2, 2020

(51) Int. Cl.
*G06F 16/2455* (2019.01)
*G06F 16/25* (2019.01)
*H04L 29/06* (2006.01)

(52) U.S. Cl.
CPC ...... *G06F 16/24568* (2019.01); *G06F 16/252* (2019.01); *H04L 63/126* (2013.01); *H04L 63/20* (2013.01); *H04L 63/306* (2013.01)

(58) Field of Classification Search
None
See application file for complete search history.

(56) References Cited

U.S. PATENT DOCUMENTS

| | | | |
|---|---|---|---|
| 3,587,057 A | 6/1971 | Armstrong et al. | |
| 5,193,185 A | 3/1993 | Lanter | |
| 5,274,805 A | 12/1993 | Ferguson et al. | |
| 6,343,295 B1 | 1/2002 | MacLeod et al. | |
| 6,434,558 B1 | 8/2002 | MacLeod et al. | |
| 6,871,272 B2 | 3/2005 | Butterworth | |
| 9,063,998 B2 | 6/2015 | Kozina et al. | |
| 9,075,860 B2 | 7/2015 | Kozina et al. | |
| 9,110,967 B2 | 8/2015 | Halberstadt | |
| 9,659,042 B2 | 5/2017 | Puri et al. | |
| 10,025,878 B1 | 7/2018 | Lefever et al. | |

(Continued)

FOREIGN PATENT DOCUMENTS

| | | |
|---|---|---|
| CN | 103745319 A | 4/2014 |
| WO | 2016011442 A1 | 1/2016 |

*Primary Examiner* — Brandon S Hoffman
(74) *Attorney, Agent, or Firm* — Moore & Van Allen PLLC; Nicholas C. Russell (57) ABSTRACT

Embodiments of the present invention provide a system for tracking and mapping flow of resources. The system is configured for receiving data from an external computing system, categorizing the data received from the external computing system, transferring the data to a first internal computing system, identifying transfer of the data from the first internal computing system to at least one other internal computing system, creating an interactive map associated with the transfer of the data from the external computing system to the at least one internal computing system, wherein the interactive map comprises one or more hop levels associated with the transfer of the data, receiving a query from one or more internal computing systems, wherein the query is associated with lineage of the data, and transmitting control signals to cause the one or more internal computing systems to display the interactive map associated with the data.

19 Claims, 5 Drawing Sheets

(56) References Cited

U.S. PATENT DOCUMENTS

| | | | |
|---|---|---|---|
| 10,089,335 B2 | 10/2018 | Liensberger et al. | |
| 10,277,608 B2 | 4/2019 | Krishnamurthy | |
| 10,331,660 B1 | 6/2019 | Chapin | |
| 10,628,058 B1 * | 4/2020 | Riley | G06F 3/067 |
| 2002/0049680 A1 | 4/2002 | Schull | |
| 2004/0243622 A1 | 12/2004 | Morisawa | |
| 2005/0203892 A1 * | 9/2005 | Wesley | G06F 21/6227 |
| 2008/0040388 A1 | 2/2008 | Petri et al. | |
| 2009/0100165 A1 * | 4/2009 | Wesley, Sr. | G06F 16/245 709/223 |
| 2010/0235285 A1 * | 9/2010 | Hoffberg | G06Q 20/401 705/75 |
| 2013/0332423 A1 | 12/2013 | Puri et al. | |
| 2014/0114907 A1 | 4/2014 | Kozina et al. | |
| 2016/0196187 A1 | 7/2016 | Thakur et al. | |
| 2017/0126702 A1 | 5/2017 | Krishnamurthy | |
| 2018/0157702 A1 | 6/2018 | Clemens et al. | |

\* cited by examiner

INTERACTIVE LINEAGE MAPPING SYSTEM

BACKGROUND

Current systems do not have capability to track and map resources associated with an entity effectively, thereby resulting in misappropriation of resources. Therefore, there exists a need for a system to track and map the resources associated with the entity efficiently.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for tracking and mapping flow of resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives data from at least one external computing system, categorizes the data received from the at least one external computing system, transfers the data to a first internal computing system, identifies initiation of transfer of the data from the first internal computing system to at least one other internal computing system, identifying completion of the transfer of the data from the first internal computing system to at least one other internal computing system, creates an interactive map associated with the transfer of the data from the at least one external computing system to the at least one internal computing system, wherein the interactive map comprises one or more hop levels associated with the transfer of the data, receives a query from one or more internal computing systems, wherein the query is associated with lineage of the data, and transmits control signals to cause the one or more internal computing systems to display the interactive map associated with the data.

In some embodiments, the present invention identifies transformation of the data by the at least one internal computing system and modifies the interactive map to include the transformation of the data.

In some embodiments, the present invention in response to identifying the initiation of the transfer of the data, identifies one or more security measures associated with the at least one other internal computing system, determines that the one or more security measures do not meet a predetermined criteria, and in response to determining that the one or more security measures do not meet the predetermined criteria, wherein the predetermined criteria varies based on a exposure level associated with the data, wherein the exposure level is based on the categorization of the data, implements one or more exposure mitigation steps before the completion of the transfer of the data from the first internal computing system to the at least one other internal computing system.

In some embodiments, the present invention the one or more exposure mitigation steps comprise automatically transfer and install a security patch on the at least one other internal computing system.

In some embodiments, the present invention the one or more exposure mitigation steps comprise prompting at least one user of the at least one other internal computing system to update the one or more security measures associated with the at least one other internal computing system.

In some embodiments, the present invention the one or more exposure mitigation steps comprise performing exposure analysis associated with the transfer of the data, calculating exposure factor associated with the transfer of the data based on the analysis, and transmitting an alert to a first user of the first internal computing system.

In some embodiments, the present invention in response to identifying the initiation of the transfer of the data, identifies that the data is associated with a high exposure category based on the categorization of data, identifies at least one user associated with the at least one other internal computing system, and determines that the at least one user has authorization to access the data before the completion of the transfer of the data from the first internal computing system to the at least one other internal computing system.

In some embodiments, the interactive map further comprises at least one of information associated with the at least one internal computing system, the first internal computing system, and the at least one external computing system associated with the transfer of the data, user information associated with one or more users that are associated with the at least one internal computing system, the first internal computing system, and the at least one external computing system associated with the transfer of the data, one or more consents associated with the data, where the one or more consents are provided by a creator of the data, retention period associated with the data, wherein the retention period is provided by the creator of the data, and category of exposure associated with the data based on the categorization of the data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resources" may be any electronic documents comprising data associated with an entity. An example of a resource may be a data file. The term "data" may refer to any of the data associated with an entity. As used herein, the terms "entity system" or "entity" may be any financial institution including, but not limited to, commercial banks, thrifts, federal and state savings banks, savings and loan associations, credit unions, investment companies, insurance companies and the like. In an embodiment, where the "entity" is a financial institutor, the term "data" may include financial data, customer data, transaction data, or any other data associated with the financial institution. In some embodiments, the entity system may be any of the non-financial institutions.

Current systems do not have capability to track and map resources associated with an entity effectively. In such cases, there is a higher possibility of misappropriation of resources. An example of such misappropriation is a data breach, in which an which an unauthorized entity retrieves, accesses or otherwise views data are becoming more common place. As a means of trying to protect against such data breaches, governments and other regulatory entities have recently initiated stringent regulations for protecting personal data which require adherence by entities that possess such data. For example, the European Union (EU), has recently established the General Data Protection Regulation (GDPR) on data protection and privacy for all individuals within the EU and additionally addresses the export of personal data outside of the EU. Many large enterprises, such as retail businesses and financial institutions, are required to possess personal data (i.e., customer data) as a means of conducting business. In this regard, many of these large enterprises digitally communicate, on an ongoing basis, data files that contain personal information. For examples, such data files may include records of transactions conducted by customers, specifics of loan held or applied for by customers and the like most of which include some form of the customer's personal data. In many instances, once the data files are received within the large enterprise the data therein is immediately distributed to various repositories and/or applications, which rely on the data to conduct an associated task. However, once the data files have been received and the data therein is disseminated to the various repositories and/or applications it becomes almost impossible to control the data in a consistent manner and, more specifically, insure that both internal and external (i.e., government regulations) procedures related to viewing, accessing using the data and the like are adhered to. Additionally, it is also impossible to protect the data against various security breaches without actually tracking and controlling the data.

Therefore, a need exists to develop systems, apparatus, methods or the like for tracking and mapping usage of data and also for implementing one or more measures to prevent the misappropriation of data. The system of the present invention effectively maps and tracks the data within and entity and implements one or more mitigation steps to reduce the level of exposure associated with the data. The system of the present invention efficiently protects the data based on the dynamic tracking and mapping features as discussed in detail below, thereby ensuring compliance to internal and/or external standards and regulations.

Figure 1:
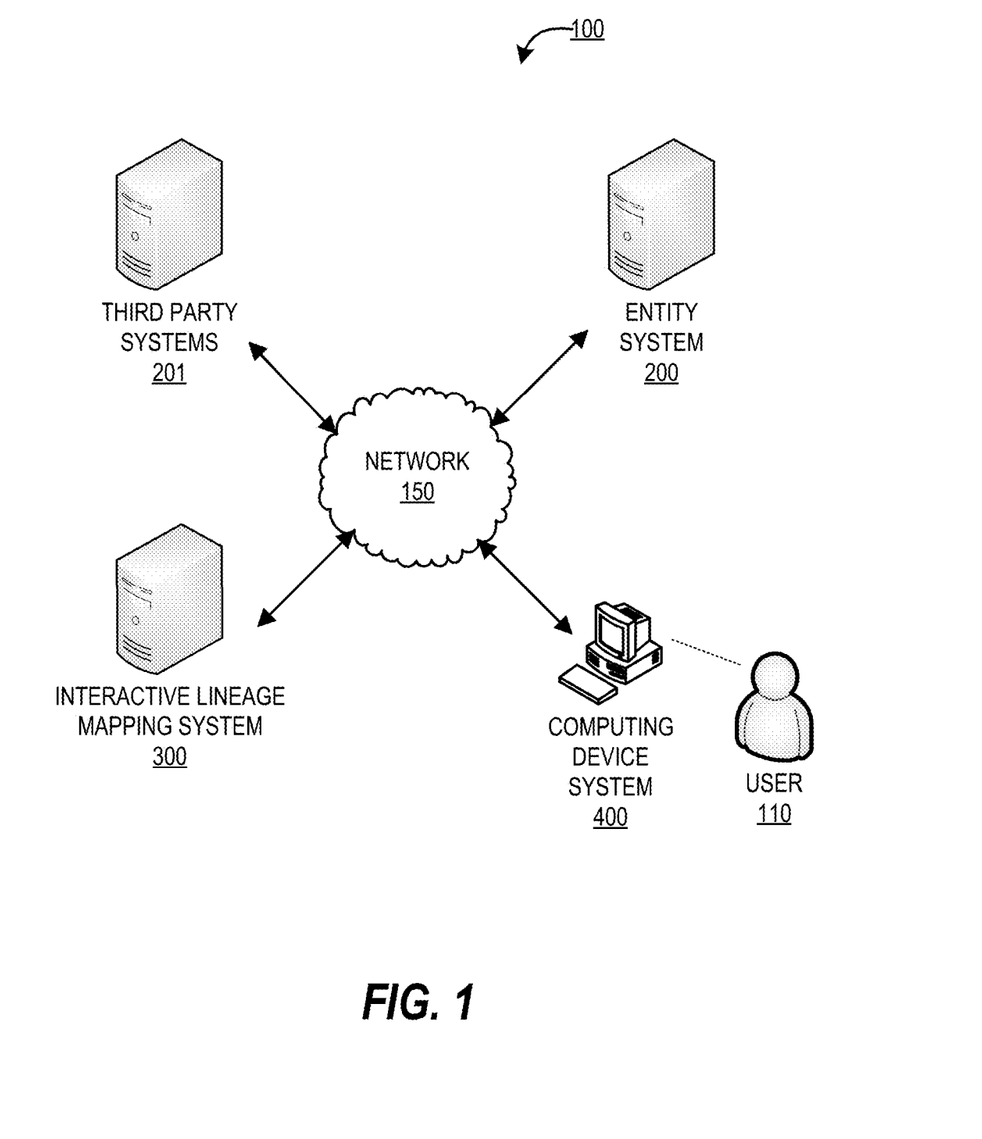
FIG. 1 provides a block diagram illustrating a system environment for tracking and mapping flow of resources, in accordance with an embodiment of the invention.

FIG. 1 provides a block diagram illustrating a system environment 100 for tracking and mapping flow of resources, in accordance with an embodiment of the invention. As illustrated in FIG. 1, the environment 100 includes an interactive lineage mapping system 300, entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the managing entity is a financial institution. In some embodiments, the managing entity is a non-financial institution.

The interactive lineage mapping system 300 is a system of the present invention for performing one or more process steps described herein. In some embodiments, the interactive lineage mapping system 300 may be an independent system. In some embodiments, the interactive lineage mapping system 300 may be a part of the entity system 200.

The interactive lineage mapping system 300, the entity system 200, the computing device system 400, and/or the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the interactive lineage mapping system 300 is configured to communicate information or instructions with the entity system 200, the computing device system 400, and/or the third party systems 201 across the network 150.

The computing device system 400 may be a system owned or controlled by the entity of the entity system 200 and the user 110. As such, the computing device system 400 may be a computing device of the user 110. In general, the computing device system 400 communicates with the user 110 via a user interface of the computing device system 400, and in turn is configured to communicate information or instructions with the interactive lineage mapping system 300, entity system 200, and/or the third party systems 201 across the network 150. There may be one or more entity systems 200 and one or more computing devices 400. The third party systems 201 may be external systems that supply data to the entity system 200, the interactive lineage mapping system 300, and/or the user computing system 400.

Figure 2:
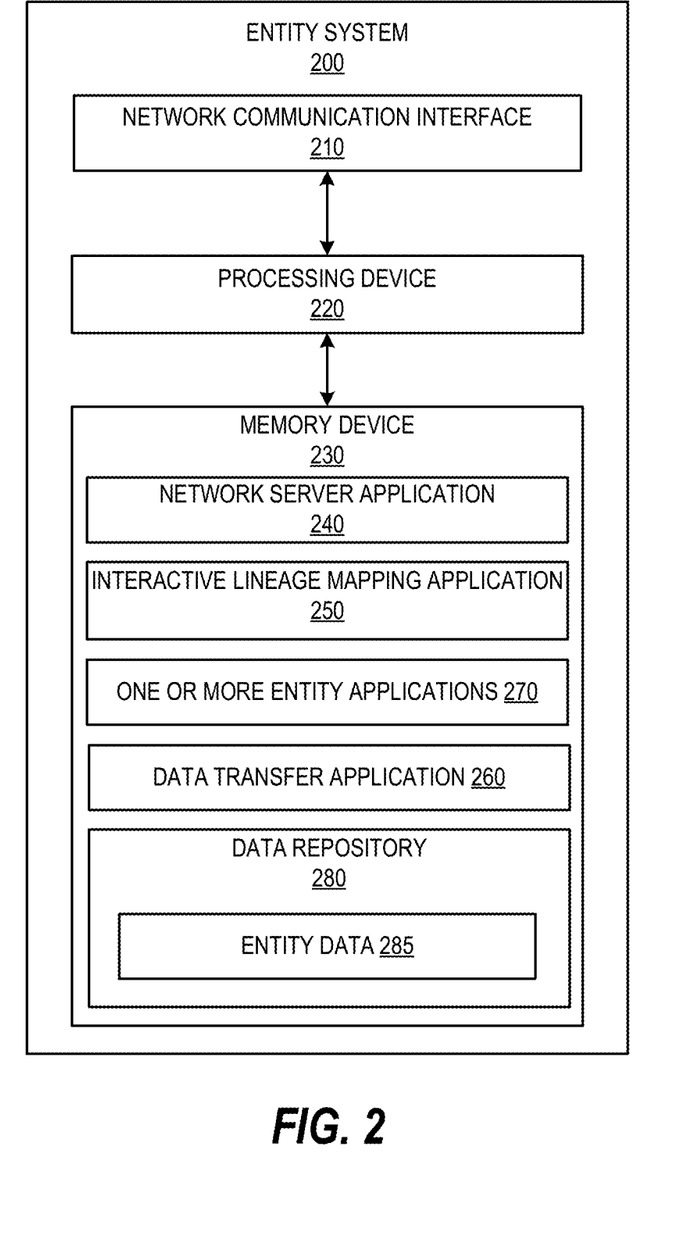
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an interactive lineage mapping application 250, one or more entity applications 270, a data transfer application 260, and a data repository 280 comprising entity data 285. The computer-executable program code of the network server application 240, the interactive lineage mapping application 250, the one or more entity applications 270, and the data transfer application 260 to perform certain logic, data-extraction, and data-storing functions of the entity system 200 described herein, as well as communication functions of the entity system 200.

The network server application 240, the interactive lineage mapping application 250, the one or more entity applications 270, and the data transfer application 260 are configured to store data in the data repository 280 or to use the data stored in the data repository 280 when communicating through the network communication interface 210 with the interactive lineage mapping system 300, the computing device system 400, and/or the third party systems 201 to perform one or more process steps described herein. In some embodiments, the entity system 200 may receive instructions from the interactive lineage mapping system 300 via the interactive lineage mapping application 250 to perform certain operations. The interactive lineage mapping application 250 may be provided by the interactive lineage mapping system 300. The one or more entity applications 270 may be any of the applications used, created, modified, and/or managed by the entity system 200. The data transfer application 260 may be used to send or receive data from the interactive lineage mapping system 300, third party systems 201, other entity systems, and/or the user computing system 400.

Figure 3:
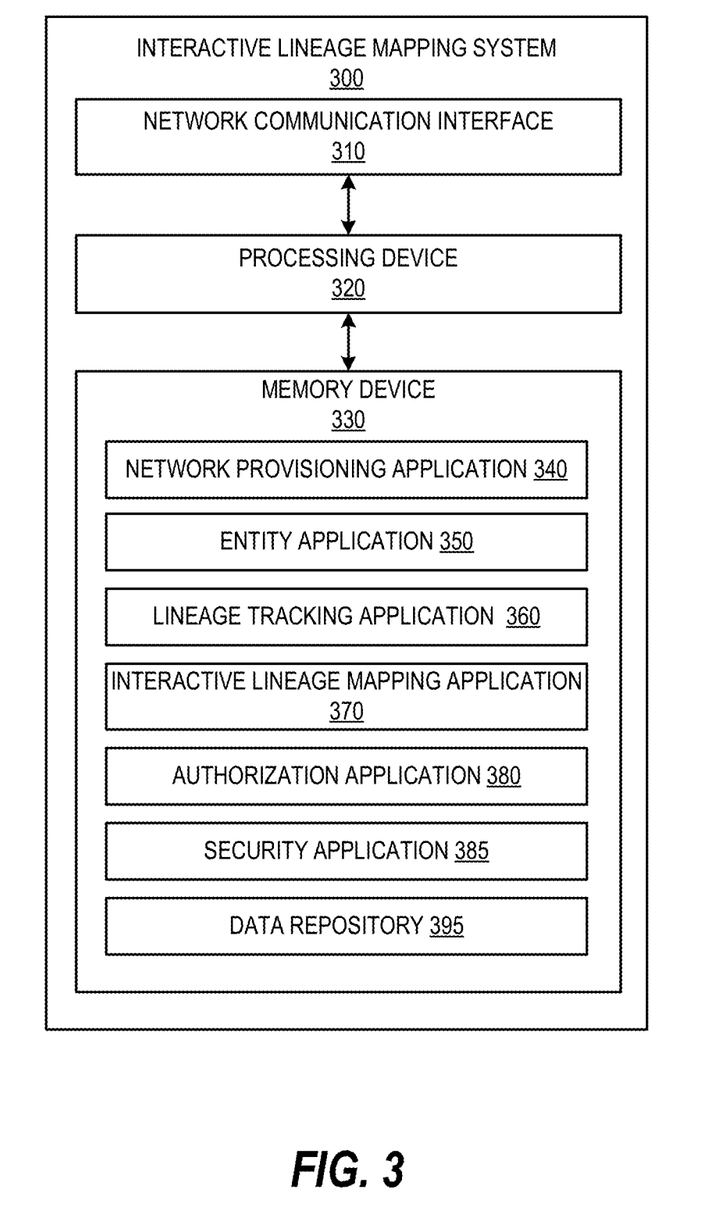
FIG. 3 provides a block diagram illustrating an interactive lineage mapping system 300 of FIG. 1, in accordance with an embodiment of the invention.

FIG. 3 provides a block diagram illustrating the interactive lineage mapping system 300 in greater detail, in accordance with embodiments of the invention. As illustrated in FIG. 3, in one embodiment of the invention, the interactive lineage mapping system 300 includes one or more processing devices 320 operatively coupled to a network communication interface 310 and a memory device 330. In certain embodiments, the interactive lineage mapping system 300 is operated by a first entity, such as a financial institution, while in other embodiments, the interactive lineage mapping system 300 is operated by an entity other than a financial institution. In some embodiments, the interactive lineage mapping system 300 is owned or operated by the entity of the entity system 200. In some embodiments, the interactive lineage mapping system 300 may be an independent system. In alternate embodiments, the interactive lineage mapping system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the interactive lineage mapping system 300 described herein. For example, in one embodiment of the interactive lineage mapping system 300, the memory device 330 includes, but is not limited to, a network provisioning application 340, an entity application 350, a lineage tracking application 360, an interactive lineage mapping application 370, an authorization application 380, a security application 385, and a data repository 390 comprising data processed or accessed by one or more applications in the memory device 330. The computer-executable program code of the network provisioning application 340, the entity application 350, the lineage tracking application 360, the interactive lineage mapping application 370, the authorization application 380, and the security application 385 may instruct the processing device 320 to perform certain logic, data-processing, and data-storing functions of the interactive lineage mapping system 300 described herein, as well as communication functions of the interactive lineage mapping system 300.

The network provisioning application 340, the entity application 350, the lineage tracking application 360, the interactive lineage mapping application 370, the authorization application 380, and the security application 385 are configured to invoke or use the data in the data repository 390 when communicating through the network communication interface 310 with the entity system 200, the computing device system 400, and/or the third party systems 201. In some embodiments, the network provisioning application 340, the entity application 350, the lineage tracking application 360, the interactive lineage mapping application 370, the authorization application 380, and the security application 385 may store the data extracted or received from the entity system 200, the third party system 201, and the computing device system 400 in the data repository 390. In some embodiments, the network provisioning application 340, the entity application 350, the lineage tracking application 360, the interactive lineage mapping application 370, the authorization application 380, and the security application 385 may be a part of a single application.

In some embodiments, the interactive lineage mapping system 300 communicates with the entity system 200 via the entity application 350. In some embodiments, the lineage tracking application 360 tracks the movement of data between multiple entity systems 200 and multiple user computing systems 400. In some embodiments, the interactive lineage mapping application 370 creates interactive maps associated with data movement within an entity between multiple entity systems 200 and multiple user computing systems 400. In some embodiments, the authorization application 380 verifies whether one or more users 110 of the multiple computing systems 400 are authorized to view the data that is being transferred to the multiple computing systems 400. In some embodiments, the authorization application 380 may also verify whether an entity application of the multiple entity systems 200 has authorization to consume or view the data that is being transferred to the multiple entity systems 200. In some embodiments, the security application 385 identifies one or more security measures associated with the multiple entity systems 200 and the multiple user computing systems 400 and also provides one or more security patches or security updates to the multiple entity systems 200 and the multiple user computing systems 400.

Figure 4:
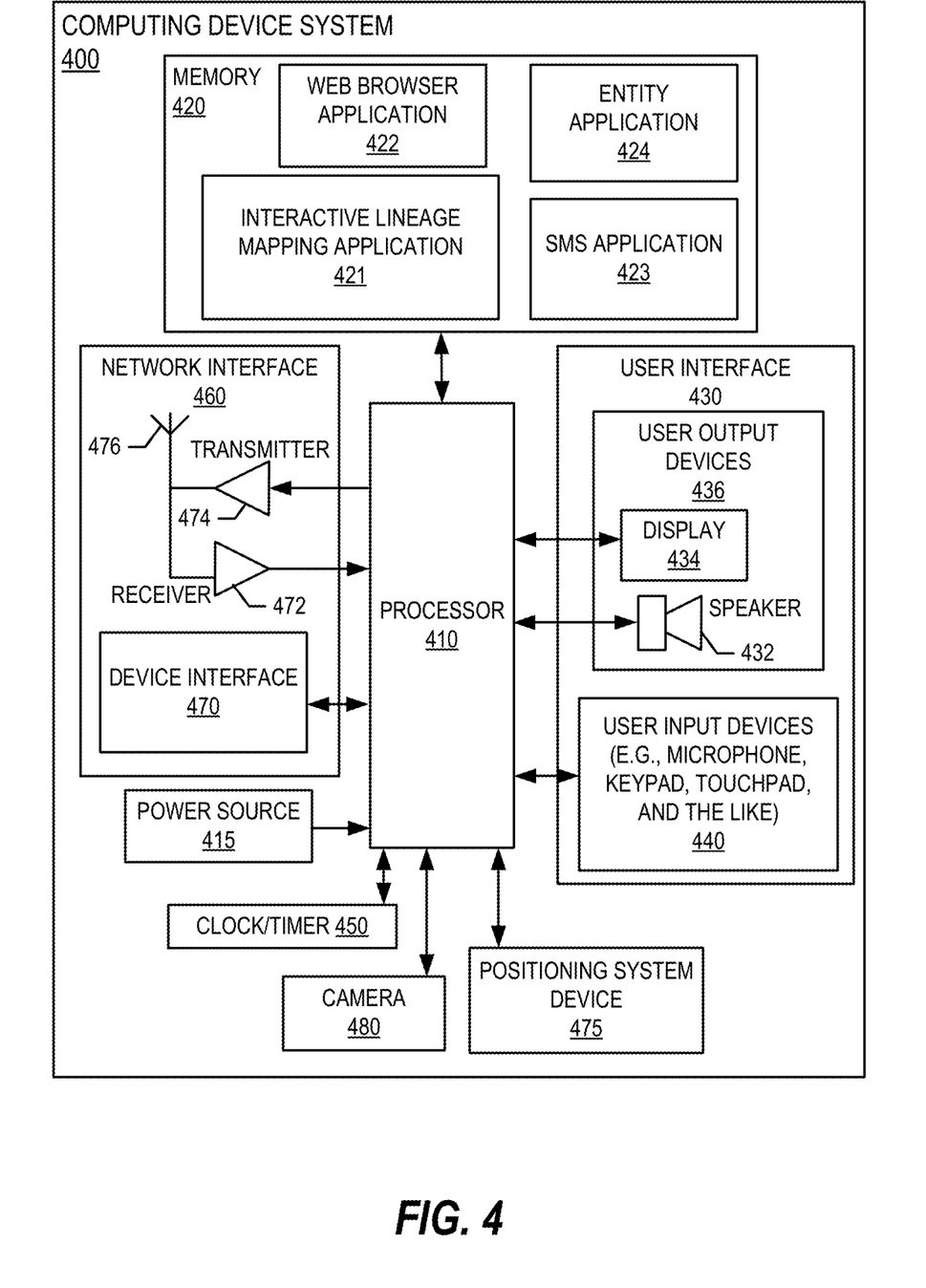
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, interactive lineage mapping application 421, entity application 424. These applications also typically instructions to a graphical user interface (GUI) on the display 430 that allows the user 110 to interact with the entity system 200, the interactive lineage mapping system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the interactive lineage mapping application 421 provided by the interactive lineage mapping system 300 allows the user 110 to access the one or more electronic resources stored in the entity system and/or the interactive lineage mapping system 300. In some embodiments, the interactive lineage mapping application 421 allows the user 110 to access interactive maps created by the interactive lineage mapping system 300.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
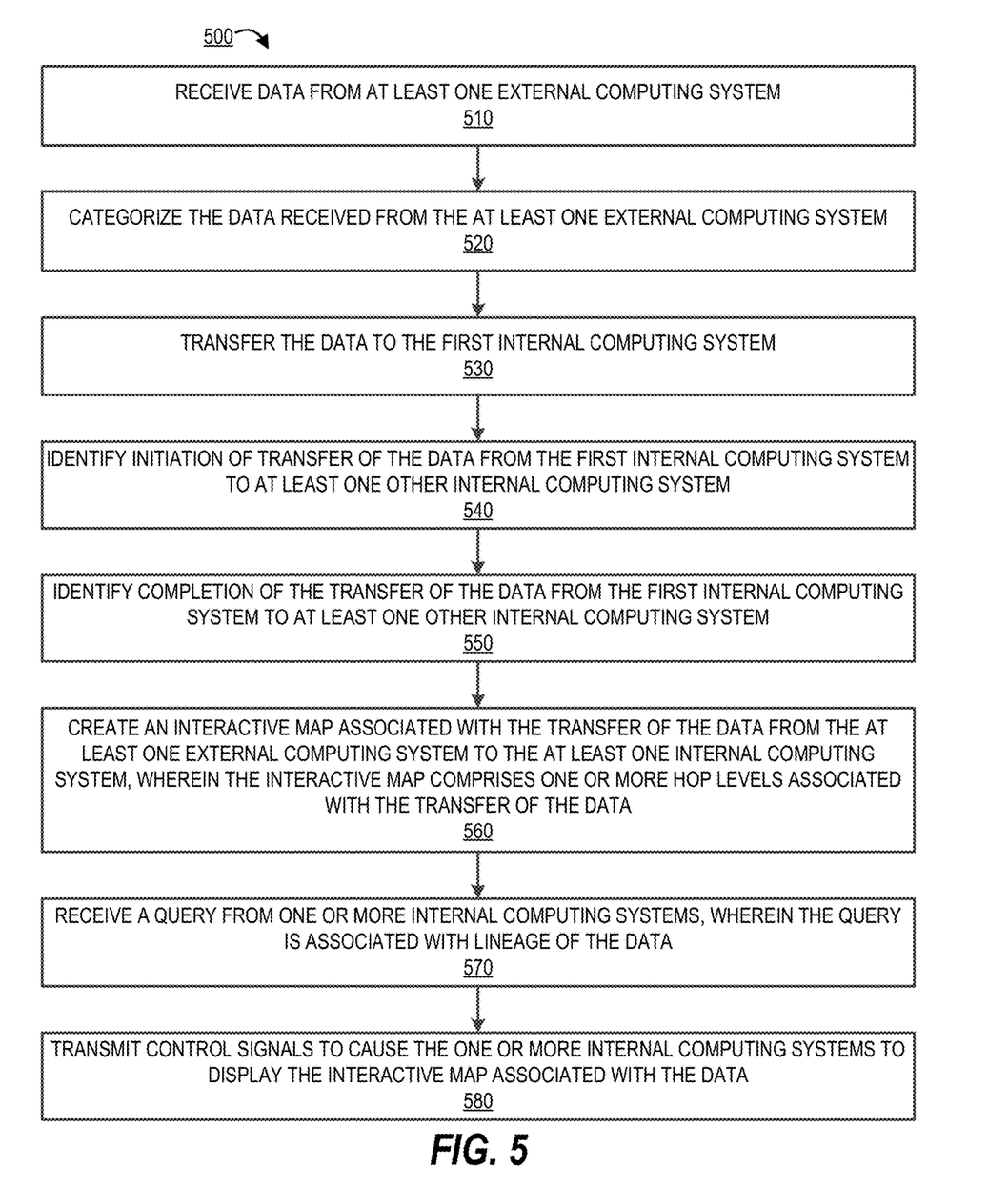
FIG. 5 provides a flowchart illustrating a process flow for tracking and mapping flow of resources, in accordance with an embodiment of the invention.

FIG. 5 provides a flowchart illustrating a process flow for tracking and mapping flow of resources, in accordance with an embodiment of the invention. As shown in block 510, the system receives data from at least one external computing system. The at least one external computing system may be a third party system 201 with respect to the FIG. 1. The at least one computing external system may be any system that provides data to the system of the present invention. For example, the at least one external system may be a merchant system, a customer device, other entity system, or like. The data may include, but is not limited to, customer information, financial information, sensitive data (e.g., Social Security Number), or the like. In one embodiment, the data may be customer personal information.

As shown in block 520, the system categorizes the data received from the at least one external computing system. The system categorizes the data based on the type of the data. For example, the system may identify that the data comprises names of customers and the system may assign low exposure level to the data. In another example, the system may identify that the data comprises social security numbers of the customers and may assign high exposure to the data.

As shown in block 530, the system transfers the data to the first internal computing system. In some embodiments, the first internal system may be any entity system that is at the highest level of hierarchy. The other entity systems and user computing systems within an entity may request any available data from the first internal computing system. In some embodiments, the first internal computing system may be any system that is used to store the incoming data.

As shown in block 540, the system identifies initiation of transfer of the data from the first internal computing system to at least one other internal computing system. In some embodiments, transfer of the data may be transferring a copy of the data that was transferred to the first internal computing system. In some embodiments, transfer of the data may be transferring the original data that was transferred to the first internal computing system. Initiation of transfer of the data may be described as receiving a request from the at least one other internal computing system. In an embodiment, the at least one other internal computing system may request data from the first internal computing system. In some other embodiments, an entity system of the multiple entity systems 200 may also request data from the first internal computing system. In some embodiments, after receiving the request from the at least one other internal computing system, the system may determine one or more security measures associated with the at least one other internal computing system. The one or more security measures may include a type of security related software installed, security settings, type of computer (e.g., public or restricted), type of network the at least one other internal computing system is connected to, and/or the like. The system, based on the categorization of data, determines whether the one or more security measures associated with the at least one other internal computing system meet a certain criteria. For example, high level exposure data may require high level security measures and low level exposure data may require minimum security measures. In response to determining that the one or more security measures associated with the at least one other internal computing system do meet the associated criteria, the system may implement one or more exposure mitigation steps. In one exemplary embodiment, the one or more exposure mitigation steps may include automatically installing a security patch on the at least one other internal computing system. In another exemplary embodiment, the one or more exposure mitigation steps may include prompting a user of the at least one other internal computing system to install a security patch. In another exemplary embodiment, the one or more exposure mitigation steps may include automatically changing the security settings associated with the at least one other internal computing system.

The system after implementing the one or more exposure mitigation steps, may check whether the one or more security measures meet the criteria. After determining that the one or more security measures at least one other internal computing system meet the criteria, the system transmits control signals to allows the first internal computing system to transfer data to the at least one other internal computing system. As shown in block 550, the system identifies completion of the transfer of the data from the first internal computing system to at least one other internal computing system.

In some embodiments, the system may perform exposure analysis associated with the transfer of the data, calculate exposure factor associated with the transfer of the data based on the analysis, and transmit an alert to a first user of the first internal computing system. In some embodiments, the system may identify at least one user associated with the at least one other internal computing system and determine whether the at least one user has authorization to access the data before the completion of the transfer of the data from the first internal computing system to the at least one other internal computing system. For example, when the data is associated with a high exposure level based on the categorization of the data, the system may identify initiation of the transfer of data and may verify whether a user associated with the at least one other internal computing system has access to view the data. In one embodiments, the system may determine that the user does not have access to view the data and may transmit one or more alerts to a first user of the first internal computing system.

As shown in block 560, the system creates an interactive map associated with the transfer of the data from the at least one external computing system to the at least one internal computing system, wherein the interactive map comprises one or more hop levels associated with the transfer of the data. One or more hop levels may be associated with the levels of data lineage. The interactive map may include information associated with the at least one internal computing system, the first internal computing system, and the at least one external computing system associated with the transfer of the data, user information associated with one or more users that are associated with the at least one internal computing system, the first internal computing system, and the at least one external computing system associated with the transfer of the data, one or more consents associated with the data, where the one or more consents are provided by a creator of the data, retention period associated with the data, wherein the retention period is provided by the creator of the data, and category of exposure associated with the data based on the categorization of the data.

As shown in block 570, the system receives a query from one or more internal computing systems, wherein the query is associated with lineage of the data. As shown in block 580, the system transmits control signals to cause the one or more internal computing system to display the interactive map associated with the data.

The system may dynamically track the transfer of data between one or more internal computing systems and update the interactive map. In some embodiments, the system may also identify transformation of data performed by at least one internal computing system and in response to identifying that the data is transformed, modifies the interactive map to include the transformation of the data in the interactive map. For example, the system may display the data transformation on the interactive map via any of the visualization techniques.

In some embodiments, the system may identify exposure level of data that is a combination of different types of data received at different time periods. In other words, in some embodiments, the system identifies exposure associated with a combination of different types of data that is accumulated in internal computing systems over a period of time. For example, the system may receive and transfer to a first internal computing system, a user's utility bill at time period t1, user's account and transaction data at time period t2, and user's authentication credentials at time period t3. The system may initially assign low, medium, and high level exposure to the data received at time period t1, time period t2, and time period t3 respectively. However, the combination of data received at time period t1, time period t2, and time period t3 may pose a very high level exposure. The system tracks and identifies the transfer of data and accumulation of data in one or more internal computing systems and implements one or more mitigation steps based on the identified exposure level for the combination of data accumulated over a period of time. Continuing with the previous example, the system may implement one or more mitigation steps associated with the high level exposure data on the first internal computing system. In some embodiments, if the identified exposure level associated with the combination of data is medium, the system before transferring new data to one or more internal computing systems identifies that the combination of existing data and the new data poses a high level exposure and implements one or more mitigation steps associated with the high exposure level accordingly.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for interactive tracking and mapping flow of resources, the system comprising:
   at least one non-transitory storage device; and
   at least one processing device coupled to the at least one non-transitory storage device, wherein the at least one processing device is configured to:
   receive data from at least one external computing system;
   in response to receiving the data from the at least one external computing system, identify a type of the data;
   categorize the data received from the at least one external computing system into one or more exposure levels based on the type of the data;
   transfer the data to a first internal computing system;
   identify initiation of transfer of the data from the first internal computing system to at least one other internal computing system;
   identify completion of the transfer of the data from the first internal computing system to at least one other internal computing system;
   in response to identifying the completion of the transfer of the data, create an interactive map associated with the transfer of the data from the at least one external computing system to the at least one internal computing system, wherein the interactive map comprises one or more hop levels associated with the transfer of the data, wherein the one or more hop levels are associated with data lineage of the data;
   receive a query from one or more internal computing systems, wherein the query is associated with lineage of the data;
   transmit control signals to cause the one or more internal computing systems to display the interactive map associated with the data;
   identify transformation of the data by the at least one internal computing system; and
   in response to identifying that the data is transformed, modify the interactive map to include the transformation of the data.

2. The system of claim 1, wherein in response to identifying the initiation of the transfer of the data, the at least one processing device is further configured to:
   identify one or more security measures associated with the at least one other internal computing system;
   determine that the one or more security measures do not meet a predetermined criteria, wherein the predetermined criteria varies based on an exposure level associated with the data, wherein the exposure level is based on the categorization of the data;
   in response to determining that the one or more security measures do not meet the predetermined criteria, implement one or more exposure mitigation steps before the completion of the transfer of the data from the first internal computing system to the at least one other internal computing system.

3. The system of claim 2, wherein the one or more exposure mitigation steps comprise automatically transfer and install a security patch on the at least one other internal computing system.

4. The system of claim 2, wherein the one or more exposure mitigation steps comprise prompting at least one user of the at least one other internal computing system to update the one or more security measures associated with the at least one other internal computing system.

5. The system of claim 2, wherein the one or more exposure mitigation steps comprise:
performing exposure analysis associated with the transfer of the data;
calculating exposure factor associated with the transfer of the data based on the analysis; and
transmitting an alert to a first user of the first internal computing system.

6. The system of claim 1, wherein in response to identifying the initiation of the transfer of the data, the at least one processing device is further configured to:
identify at least one user associated with the at least one other internal computing system; and
determine that the at least one user has authorization to access the data before the completion of the transfer of the data from the first internal computing system to the at least one other internal computing system.

7. The system of claim 1, wherein the interactive map further comprises at least one of:
information associated with the at least one internal computing system, the first internal computing system, and the at least one external computing system associated with the transfer of the data;
user information associated with one or more users that are associated with the at least one internal computing system, the first internal computing system, and the at least one external computing system associated with the transfer of the data;
one or more consents associated with the data, where the one or more consents are provided by a creator of the data;
retention period associated with the data, wherein the retention period is provided by the creator of the data; and
category of exposure associated with the data based on the categorization of the data.

8. A computer program product for tracking and mapping flow of resources, the computer program product comprising a non-transitory computer-readable storage medium having computer-executable instructions for causing a computer processor to perform the steps of:
receiving data from at least one external computing system;
in response to receiving the data from the at least one external computing system, identifying a type of the data;
categorizing the data received from the at least one external computing system into one or more exposure levels based on the type of the data;
transferring the data to a first internal computing system;
identifying initiation of transfer of the data from the first internal computing system to at least one other internal computing system;
identifying completion of the transfer of the data from the first internal computing system to at least one other internal computing system;
in response to identifying the completion of the transfer of the data, creating an interactive map associated with the transfer of the data from the at least one external computing system to the at least one internal computing system, wherein the interactive map comprises one or more hop levels associated with the transfer of the data, wherein the one or more hop levels are associated with data lineage of the data;
receiving a query from one or more internal computing systems, wherein the query is associated with lineage of the data;
transmitting control signals to cause the one or more internal computing systems to display the interactive map associated with the data;
identifying transformation of the data by the at least one internal computing system; and
in response to identifying that the data is transformed, modifying the interactive map to include the transformation of the data.

9. The computer program product of claim 8, wherein in response to identifying the initiation of the transfer of the data, the computer readable instructions further cause the computer processor to:
identify one or more security measures associated with the at least one other internal computing system;
determine that the one or more security measures do not meet a predetermined criteria, wherein the predetermined criteria varies based on a exposure level associated with the data, wherein the exposure level is based on the categorization of the data; and
in response to determining that the one or more security measures do not meet the predetermined criteria, implement one or more exposure mitigation steps before the completion of the transfer of the data from the first internal computing system to the at least one other internal computing system.

10. The computer program product of claim 9, wherein the one or more exposure mitigation steps comprise automatically transfer and install a security patch on the at least one other internal computing system.

11. The computer program product of claim 9, wherein the one or more exposure mitigation steps comprise:
performing exposure analysis associated with the transfer of the data;
calculating exposure factor associated with the transfer of the data based on the analysis; and
transmitting an alert to a first user of the first internal computing system.

12. The computer program product of claim 8, wherein in response to identifying the initiation of the transfer of the data, the computer readable instructions further cause the computer processor to:
identify at least one user associated with the at least one other internal computing system; and
determine that the at least one user has authorization to access the data before the completion of the transfer of the data from the first internal computing system to the at least one other internal computing system.

13. The computer program product of claim 8, wherein the interactive map further comprises at least one of:
information associated with the at least one internal computing system, the first internal computing system, and the at least one external computing system associated with the transfer of the data;
user information associated with one or more users that are associated with the at least one internal computing system, the first internal computing system, and the at least one external computing system associated with the transfer of the data;

one or more consents associated with the data, where the one or more consents are provided by a creator of the data;

retention period associated with the data, wherein the retention period is provided by the creator of the data; and category of exposure associated with the data based on the categorization of the data.

14. A computerized method for interactive tracking and mapping flow of resources, the method comprising:

receiving data from at least one external computing system;

in response to receiving the data from the at least one external computing system, identifying a type of the data;

categorizing the data received from the at least one external computing system into one or more exposure levels based on the type of the data;

transferring the data to a first internal computing system;

identifying initiation of transfer of the data from the first internal computing system to at least one other internal computing system;

identifying completion of the transfer of the data from the first internal computing system to at least one other internal computing system;

in response to identifying the completion of the transfer of the data, creating an interactive map associated with the transfer of the data from the at least one external computing system to the at least one internal computing system, wherein the interactive map comprises one or more hop levels associated with the transfer of the data, wherein the one or more hop levels are associated with data lineage of the data;

receiving a query from one or more internal computing systems, wherein the query is associated with lineage of the data;

transmitting control signals to cause the one or more internal computing systems to display the interactive map associated with the data;

identifying transformation of the data by the at least one internal computing system; and in response to identifying that the data is transformed, modifying the interactive map to include the transformation of the data.

15. The computerized method of claim 14, wherein the method further comprises:

identifying one or more security measures associated with the at least one other internal computing system;

determine that the one or more security measures do not meet a predetermined criteria, wherein the predetermined criteria varies based on a exposure level associated with the data, wherein the exposure level is based on the categorization of the data; and in response to determining that the one or more security measures do not meet the predetermined criteria, implementing one or more exposure mitigation steps before the completion of the transfer of the data from the first internal computing system to the at least one other internal computing system.

16. The computerized method of claim 14, wherein the method further comprises:

identifying at least one user associated with the at least one other internal computing system; and determining that the at least one user has authorization to access the data before the completion of the transfer of the data from the first internal computing system to the at least one other internal computing system.

17. The computerized method of claim 14, wherein the interactive map further comprises at least one of:

information associated with the at least one internal computing system, the first internal computing system, and the at least one external computing system associated with the transfer of the data;

user information associated with one or more users that are associated with the at least one internal computing system, the first internal computing system, and the at least one external computing system associated with the transfer of the data;

one or more consents associated with the data, where the one or more consents are provided by a creator of the data;

retention period associated with the data, wherein the retention period is provided by the creator of the data; and category of exposure associated with the data based on the categorization of the data.

18. The computerized method of claim 15, wherein the one or more exposure mitigation steps comprise automatically transfer and install a security patch on the at least one other internal computing system.

19. The computerized method of claim 15, wherein the one or more exposure mitigation steps comprise:

performing exposure analysis associated with the transfer of the data;

calculating exposure factor associated with the transfer of the data based on the analysis; and transmitting an alert to a first user of the first internal computing system.

* * * * *